(12) United States Patent
Buschena

(10) Patent No.: US 8,172,032 B2
(45) Date of Patent: *May 8, 2012

(54) COMBINATION DRIVE AND SUSPENSION SYSTEM FOR A VEHICLE

(75) Inventor: John Buschena, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,944

(22) Filed: Jun. 27, 2011

(65) Prior Publication Data

US 2011/0253472 A1 Oct. 20, 2011

Related U.S. Application Data

(63) Continuation of application No. 12/719,551, filed on Mar. 8, 2010, now Pat. No. 7,967,101, which is a continuation of application No. 11/444,122, filed on May 31, 2006, now Pat. No. 7,673,719.

(60) Provisional application No. 60/685,858, filed on May 31, 2005.

(51) Int. Cl.
- *B60K 17/04* (2006.01)
- *B60G 3/14* (2006.01)
- *F16H 7/06* (2006.01)
- *F16H 35/06* (2006.01)

(52) U.S. Cl. ........ 180/344; 180/357; 180/363; 180/373; 474/144; 474/146; 474/148; 474/150

(58) Field of Classification Search .................. 180/357, 180/348, 383–385, 344, 363, 372, 373, 24.05, 180/361, 24.08, 209; 474/148, 150, 144, 474/146; 280/124.129

See application file for complete search history.

(56) References Cited

U.S. PATENT DOCUMENTS

| | | | | | |
|---|---|---|---|---|---|
| 2,098,894 | A | * | 11/1937 | Van Doorne et al. | 180/24.05 |
| 2,610,048 | A | * | 9/1952 | Lindgren | 299/49 |
| 2,750,199 | A | * | 6/1956 | Hart | 280/638 |
| 3,045,773 | A | * | 7/1962 | Sampietro | 180/263 |
| 3,154,164 | A | * | 10/1964 | Shaw et al. | 180/209 |
| 3,208,544 | A | * | 9/1965 | Colvin | 180/8.3 |
| 3,620,321 | A | * | 11/1971 | Thibodeau | 180/16 |
| 4,577,711 | A | * | 3/1986 | Butler | 180/24.1 |
| 5,054,572 | A | * | 10/1991 | Parker | 180/224 |
| 6,203,465 | B1 | * | 3/2001 | Showalter | 475/204 |
| 6,231,470 | B1 | * | 5/2001 | Cook et al. | 475/206 |
| 6,364,048 | B1 | * | 4/2002 | McComber | 180/350 |
| 6,460,643 | B1 | * | 10/2002 | Degelman | 180/89.12 |
| 6,964,317 | B2 | * | 11/2005 | Groves et al. | 180/344 |
| 7,004,270 | B2 | * | 2/2006 | Hori et al. | 180/9.52 |
| 7,673,719 | B2 | * | 3/2010 | Buschena | 180/344 |
| 2004/0090034 | A1 | * | 5/2004 | Hori et al. | 280/124.128 |
| 2004/0178014 | A1 | * | 9/2004 | Groves et al. | 180/337 |
| 2010/0155171 | A1 | * | 6/2010 | Buschena | 180/348 |

* cited by examiner

*Primary Examiner* — Drew Brown

(57) ABSTRACT

The invention is a combination drive and suspension system that includes an upper drive assembly and a lower drive assembly pivotally connected. The pivoting drive system provides improved ground clearance for a farm vehicle capable of carrying a large quantity of field application material.

19 Claims, 7 Drawing Sheets

COMBINATION DRIVE AND SUSPENSION SYSTEM FOR A VEHICLE

CROSS-REFERENCE TO RELATED APPLICATIONS

Figure 1:
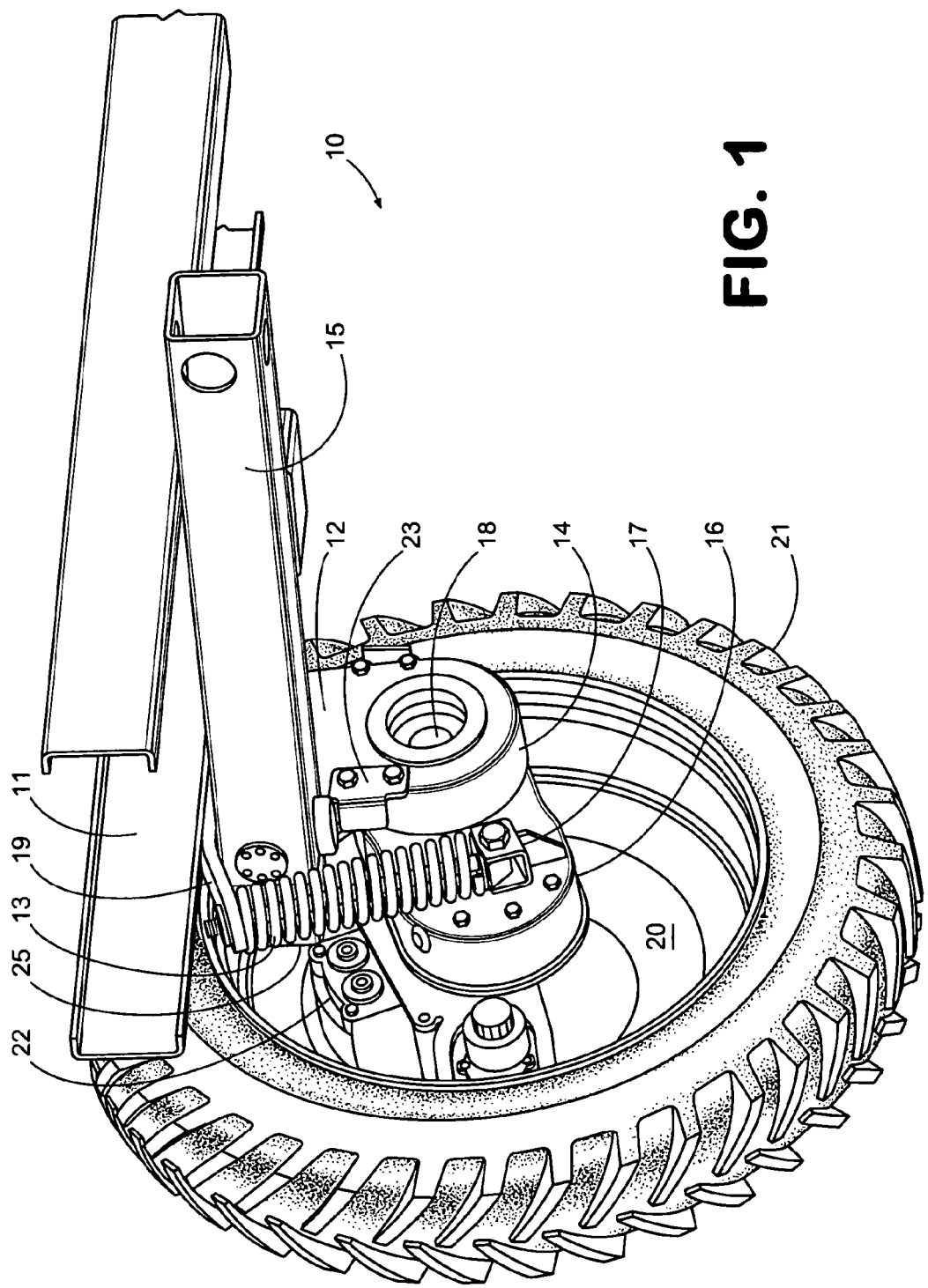
Figure 2:
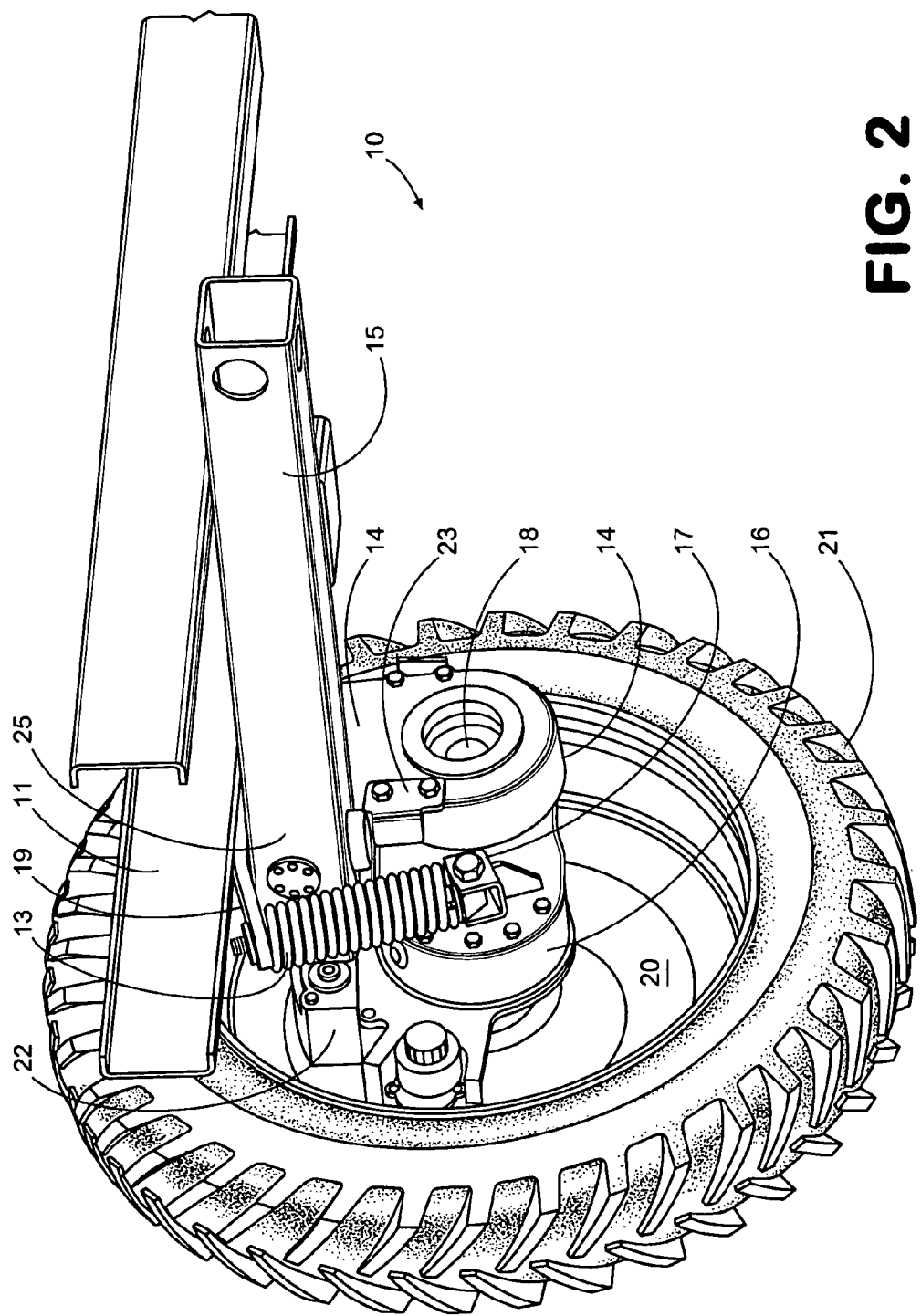
Figure 3:
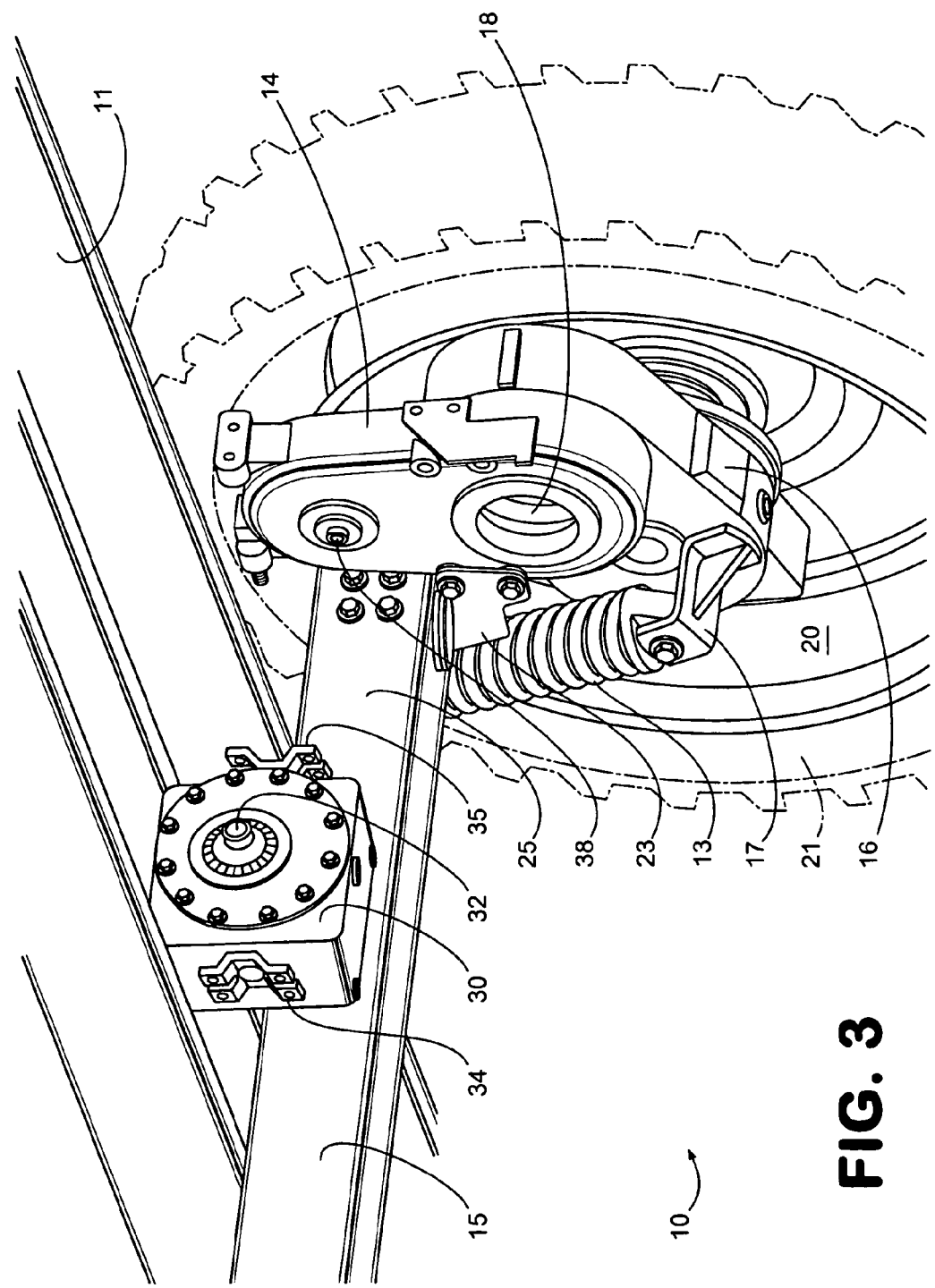
Figure 4:
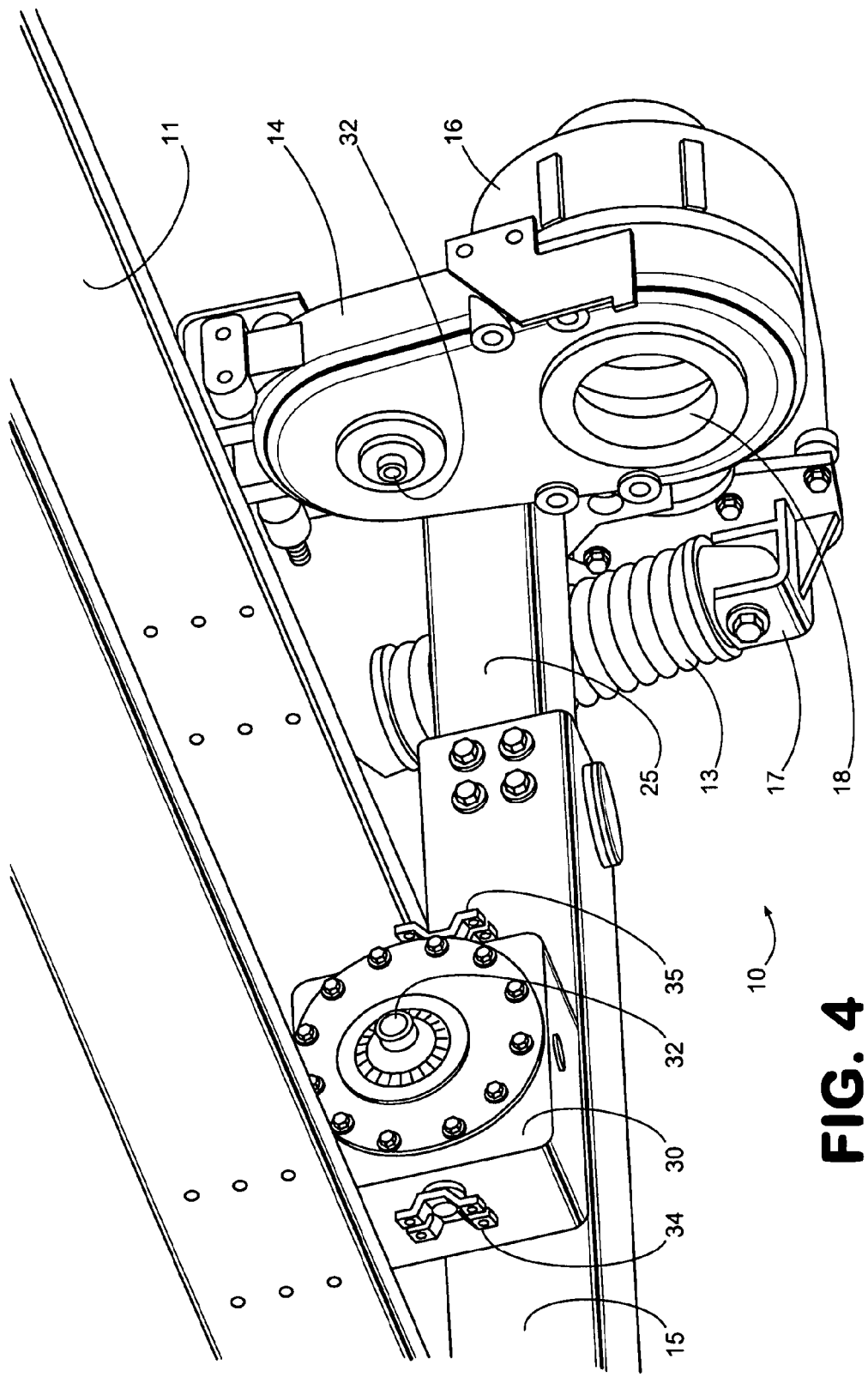

The present application is a continuation application of, identically-titled U.S. patent application Ser. No. 12/719,551, filed Mar. 8, 2010, which is a continuation application of identically-titled U.S. patent application Ser. No. 11/444,122, filed May 31, 2006, now U.S. Pat. No. 7,673,719, which claims the benefit of priority from U.S. Provisional Application No. 60/685,858, filed May 31, 2005, all of which are hereby incorporated by reference herein.

TECHNICAL FIELD

The invention relates generally to a drive system for a field application vehicle and more particularly to a double chain drive system having a pivoting junction for providing improved ground clearance for a farm vehicle.

BACKGROUND OF THE INVENTION

Farmers utilize multiple vehicle types for tending farm land, whether the work includes preparing the soil or planting or harvesting the crops. Vehicles include tractors for pulling hitched implements (e.g., plows, discs, combines, shredders, balers, etc.) and field application vehicles, or farm vehicles (e.g., row crop sprayers) for spraying fertilizers, pesticides and insecticides.

Row crop sprayers have certain features that are important for minimizing crop damage when spraying. For example, the clearance under the machine is important to provide crop clearance to allow spraying of chemicals with minimal crop disturbance through the growing cycle of the crop. In addition, the total drive package width at the wheel is also important to allow the wheel and drive package to move through certain row spacing with minimal crop damage. In this regard, the sprayer must be able to have adjustable wheel spacing to accommodate different row spacing of crops in various areas of the world.

Some current mechanical drive sprayers utilize a conventional axle (i.e., a straight axle with no drop). With this design, increased crop clearance was obtained simply by increasing the size of the tire and wheel used. This design offers limited crop clearance and wheel track adjustment is not easily accomplished. In other examples, a gear drop box is added to increase crop clearance, but the width of the drive package is increased due to this gearbox.

Farms may vary significantly in size. They range from single household operations to larger commercial or corporate operations that own or lease large tracts of land. While the types of vehicles utilized for these farms are similar in function, they differ in size. For example, tractor horsepower ratings may vary from 44 horsepower for small farm tractors up to 570 horsepower and greater for tractors used for larger operations.

Likewise, field application vehicles also range in size generally in accordance with the capacity of the vehicle. The types of vehicles differ, however, the suspension of the vehicle is an important component for nearly all of them. The suspension is important because it provides comfort for the driver over rough terrain and also enables constant or consistent application of the particular substance being applied to the land or crop. For example, the suspension will absorb at least some of the impact energy as the vehicle traverses rough terrain (e.g., terraced land, creek beds, or washouts due to flooding and erosion). It is important that the impact energy is not substantially transferred to the application equipment, which may result in interruption of the application, over application in a given area, or overspray of the application.

One problem with designing suspension systems capable of handling rough terrain while applying potentially hazardous chemicals is the cost associated with the capacity to haul a large volume of substance for application. For example, increased field application vehicle capacity requires more than merely adding a larger bulk tank to hold a substance for application. A larger tank may result in more weight for the vehicle requiring a stronger motor, more robust driveline components, and a stouter, more sophisticated suspension.

In addition, there are field operation requirements which must be satisfied. For example, typical applicator vehicles (i.e., sprayers) operate by tracking between the crop rows. Applicator vehicles must also maintain a minimum height in order to clear the crop and thus avoid damaging or destroying the crop during the application of a particular substance. Small farm vehicles having light duty drive and suspension systems are adequate for small application needs, however, such designs would not be efficient for larger operations. Larger operations require larger vehicles to carry heavier loads yet maintain the minimum height to prevent crop damage.

In this manner, the relationship between the desired capacity and the operational environment (e.g., the size of the farm) must be considered in the design of the particular vehicle. For larger farms, the increased costs associated with a larger capacity application vehicle may be substantial. For example, in order to provide large field application vehicles capable of safely carrying the weight of a loaded bulk container (e.g., substance capacity ranging from 800-1200 gallons) one design utilizes hydrostatic drive trains. Such systems are complicated and more costly than standard drive shaft systems or chain drive systems, but are best suitable for large capacity systems and can provide maneuverability without damaging crops. For these systems, standard suspensions incorporating leaf springs may be used.

For smaller field application vehicles having 300-400 gallon capacity, chain drive systems may be used. Typically, these vehicles use narrow tires for driving in between the crop rows and carry application equipment that may expand over 3 to 4 rows. Suspension systems for these vehicles may be nonexistent or simply provided by deflating the vehicle tires to soften the ride.

The need arises, however, for a field application (or farm) vehicle which has a capacity for mid-size farms (i.e., a capacity between that for a small application vehicle and that for a large application vehicle) yet the farm vehicle must incorporate a drive system and suspension system which can operate safely within the operational environment utilizing components which fit within the economics of such farms. For example, existing farm vehicles fail to safely meet this need partly because the ground clearance of conventional farm vehicles is dependent on wheel diameter. Increasing wheel diameter to increase ground clearance would raise the farm vehicle's center of gravity to an unsafe height, making it especially prone to rollover on rough terrain.

Thus there is a need for a vehicle which can operate within a farm environment without damaging crops having a drive and suspension system capable of carrying a large quantity of field application material.

SUMMARY OF THE INVENTION

The invention is a combination drive and suspension system that includes an upper drive assembly and a lower drive assembly pivotally connected. The pivoting drive system provides improved ground clearance for a farm vehicle capable of carrying a large quantity of field application material.

BRIEF DESCRIPTION OF THE DRAWINGS

FIG. 1 illustrates a perspective view of the combination drive and suspension system with the suspension being in a relatively uncompressed position as viewed from the rear of the vehicle.

FIG. 2 illustrates a perspective view of the combination drive and suspension system with the suspension being in a relatively compressed position as viewed from the rear of the vehicle.

FIG. 3 illustrates a perspective view of the combination drive and suspension system with the suspension being in a relatively uncompressed position as viewed from the front of the vehicle.

FIG. 4 illustrates a closer perspective view of the combination drive and suspension system with the suspension being in a relatively compressed position as viewed from the front of the vehicle.

FIG. 5 illustrates a side view of the combination drive and suspension system with the wheel and tire removed.

FIG. 6 is an exploded view of the upper drive assembly, lower drive assembly, pivoting joint, and hub assembly.

FIG. 7 illustrates a front view perspective illustrating that the components of the lower drop box, planetary, output shaft, and brakes are located within the backspace of the wheel.

DETAILED DESCRIPTION OF PREFERRED EMBODIMENTS

Referring to the drawings, in which like numerals represent like components, FIG. 1 shows a combination drive and suspension system 10 as viewed from the rear of the vehicle. The drive system 12 includes an upper drive assembly 14 attached to an inner support member 25 (see FIG. 4) positioned within an outer support member 15 and a lower drive assembly 16 pivotally connected to the upper drive assembly at pivoting joint 18. The upper drive assembly may be attached to the inner support member 25 using an attachment bracket 23 or other suitable hardware known to those of ordinary skill in the art. In the configuration shown in FIG. 1, the suspension 13 is extended. In this configuration, the lower drive assembly 16 is positioned at a substantially obtuse angle relative to the upper drive assembly 14. The lower drive assembly 16 has a lower suspension mount 17 for receiving one end of the suspension 13. The other end of the suspension 13 may be attached to an upper suspension mount 19 on, for example, a vehicle frame member 11. The suspension 13 may be a spring (e.g., a coil or leaf spring), shock absorber, coil over shock, or any other suitable biasing member. FIG. 1 further shows a wheel 20, tire 21, and brake assembly 22.

FIG. 2 shows the suspension 13 in a compressed position as viewed from the rear of the vehicle. In the compressed position, the lower drive assembly 16 may pivot about pivoting joint 18 wherein it is generally horizontally perpendicular to the upper drive assembly 14. The typical suspension travel distance of the lower drive assembly 16 is about six to eight inches. In addition, the suspension 13 may incorporate bump stops (not shown) to soften the impact of the suspension against the frame member 11 or the support members 15, 25 should rough terrain exceed the suspension travel capacity.

FIG. 3 illustrates the drive and suspension system 10 as viewed from the front of the vehicle. As discussed with respect to FIGS. 1 and 2, FIG. 3 illustrates the upper drive assembly 14 attached to the inner support member 25 positioned within the outer support member 15 (via the attachment bracket 23) and a lower drive assembly 16 pivotally connected to the upper drive assembly at pivoting joint 18. Other components shown include the frame member 11, suspension 13, lower suspension mount 17, wheel 20, and tire 21.

In addition, FIG. 3 illustrates a differential 30 utilized in combination with the drive assembly 10 for powering the wheels 20 of the field application vehicle. The differential 30 receives power input from a power source (e.g., an internal combustion engine, not shown) through a transmission (not shown) and a drive shaft (not shown) to the drive shaft interface 32. The drive shaft interface 32 transfers the rotational movement of the drive shaft to at least one yoke 34, 35 positioned on either side of the differential 30. Power may be transferred through the differential 30 via any suitable gearing system (e.g., "open" or "limited slip" differentials) at any suitable gear ratio known to persons of ordinary skill in the art.

At least one drive arms (or axle, not shown) rotationally connects the yoke 35 to a first drive sprocket coupling 38 on the upper drive assembly 14. Thus, movement from the driveshaft is transferred to the first drive sprocket coupling 38 that in turn moves further driveline components within the upper drive assembly 14, the lower drive assembly 16, and consequently the wheel 20 and tire 21.

FIG. 4 illustrates a closer view of the combination drive and suspension system 10 in the compressed position as shown from the front of the vehicle. Shown are the frame member 11, suspension 13, differential 30, drive shaft interface 32, yokes 34, 35, outer support member 15, inner support member 25, upper drive assembly 14, lower drive assembly 16, lower suspension mount 17, and pivoting joint 18. Also illustrated in FIG. 4 is the adjustable vehicle track width embodiment of the present invention. The inner support member 25 is slidably positioned within the outer support member 15 to allow for varying widths between the wheels (not shown).

FIG. 5 illustrates another view of the combination drive and suspension system 10 as shown from the side of the vehicle with the wheel and tire removed. Shown are several components in common with FIGS. 1 4, including the suspension 13, outer support member 15, inner support member 25, upper drive assembly 14, lower drive assembly 16, pivoting joint 18, upper suspension mount 19, attachment bracket 23. Other components shown are a brake disc 40, service brake 42, and a parking brake 44 for providing stopping power to the vehicle; wheel studs 46 for mounting the wheel (not shown), and a hub 48. The hub 48 is in geared communication with the lower drive assembly 16. Accordingly, the hub 48 receives power from the lower drive assembly 16 via the other aforementioned drive train components (i.e., upper drive assembly 14, drive shaft interface and drive shaft, differential, transmission, and engine (not shown)).

FIG. 6 is an exploded diagram of the upper drive assembly 14, the lower drive assembly 16, the pivoting joint 18, the drive shaft interface 32, the brake disc 40, and the hub 48, including all necessary chains, couplings, sprockets (or gears, including planetary gears), adapters, bearings, shafts, washers (or spacers), fasteners (e.g., pins, screws, bolts, nuts, and the like), o-rings, and spindles.

Briefly, the upper drive assembly 14 includes an upper chain housing 50. Within the upper chain housing 50 a first upper drive sprocket 52 is rotationally mounted and receives rotational input from the drive shaft (not shown) via the drive shaft interface 32. A second upper drive sprocket 54 axially aligned with the first drive sprocket 52 is also rotationally mounted. A first connecting drive member 53 (e.g., a chain or belt) is driven by first upper drive sprocket 52 and transfers rotational input to the second upper drive sprocket 54 and consequently the lower drive assembly 16.

The lower drive assembly 16 includes a lower chain housing 60. Within the lower chain housing 60 a first lower drive sprocket 62 is rotationally mounted and in communication with the second upper drive sprocket 54 of the upper drive assembly 14 via a coupling 59. A second lower drive sprocket 64 is axially aligned with first lower drive sprocket 62 and a second connecting drive member 63 (e.g., a chain or belt) is driven by the first lower drive sprocket 62. An axle member 65 in communication with the second lower drive sprocket 64 rotatively transfers power to the hub 48, which turns the wheel (not shown).

Figure 6:
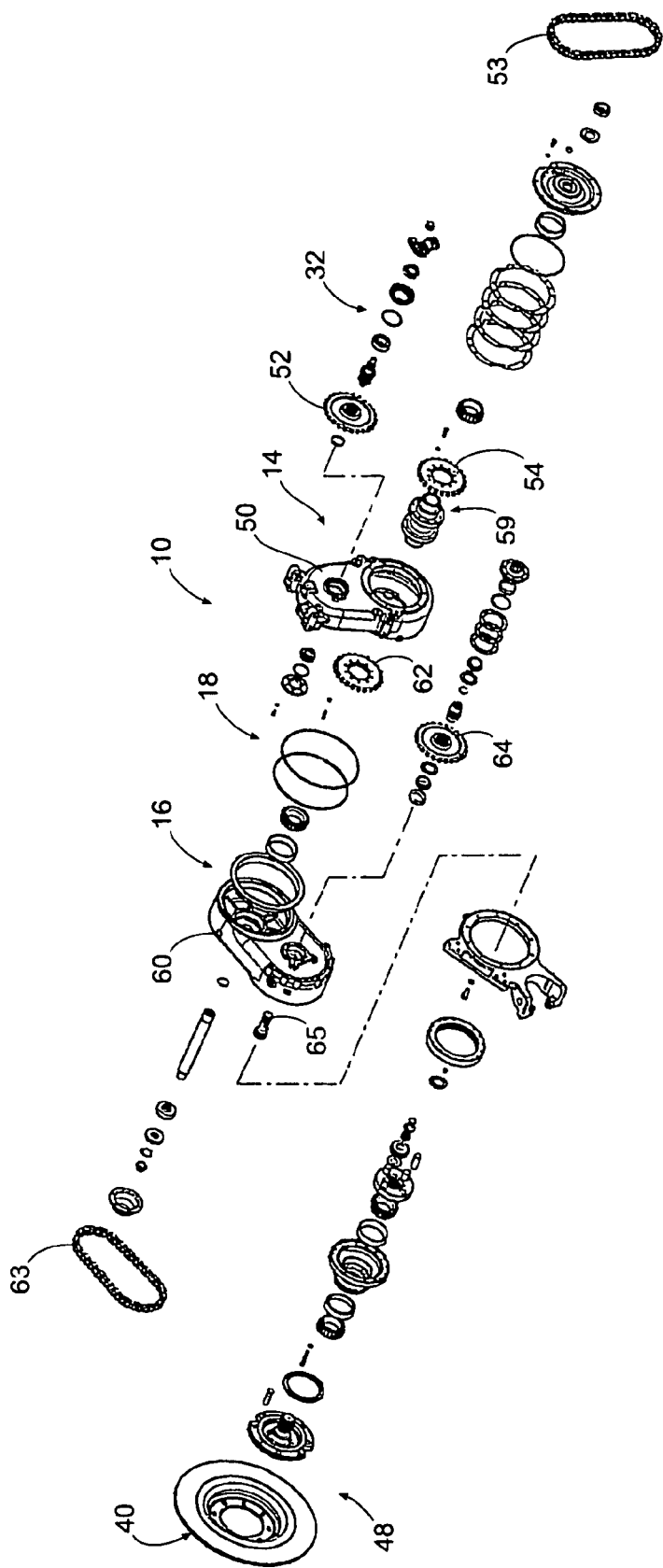

Also shown in FIG. 6 is the pivoting joint 18 at the interface of the upper drive assembly 14 and the lower drive assembly 16. The pivoting joint 18 includes a bushing pivot 59 that enables the lower drive assembly 16 to be pivotally mounted to the upper drive assembly 14.

Figure 7:
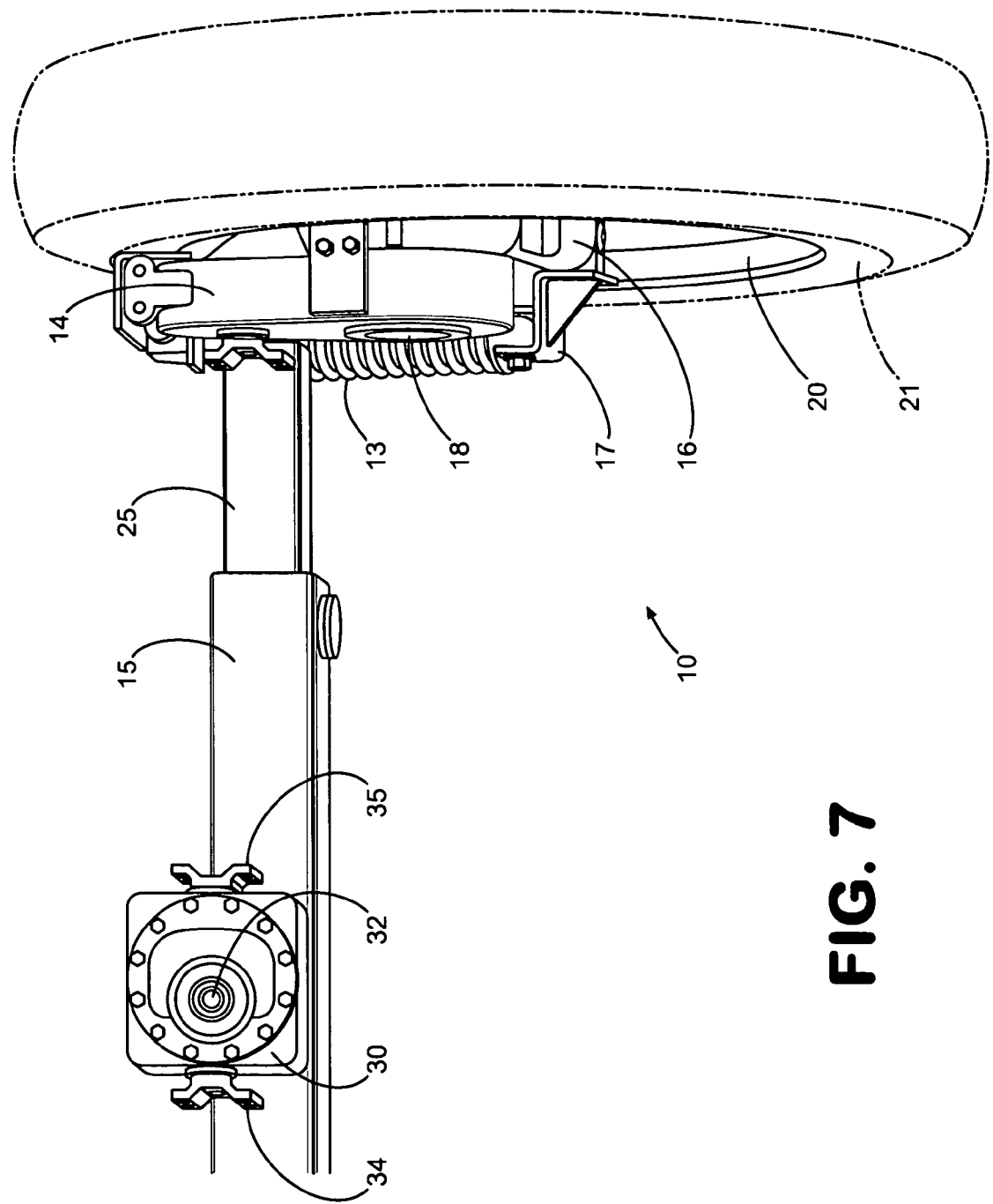

FIG. 7 illustrates the instant invention with a farm vehicle having adjustable track width. Compared to conventional drive systems that utilize a differential and axle in the same plane as the hub, the instant invention provides for improved ground clearance by offsetting the differential 30 and axle (not shown) from the plane of the hub (not shown) yet provides a robust drive system for a farm vehicle. In other words, the invention provides superior ground clearance for the farm vehicle because the axle (not shown) communicates with (and routes power through) the upper drive assembly 14 and lower drive assembly 16. In turn, the lower drive assembly 16 is in geared communication with the hub (not shown).

Figure 5:
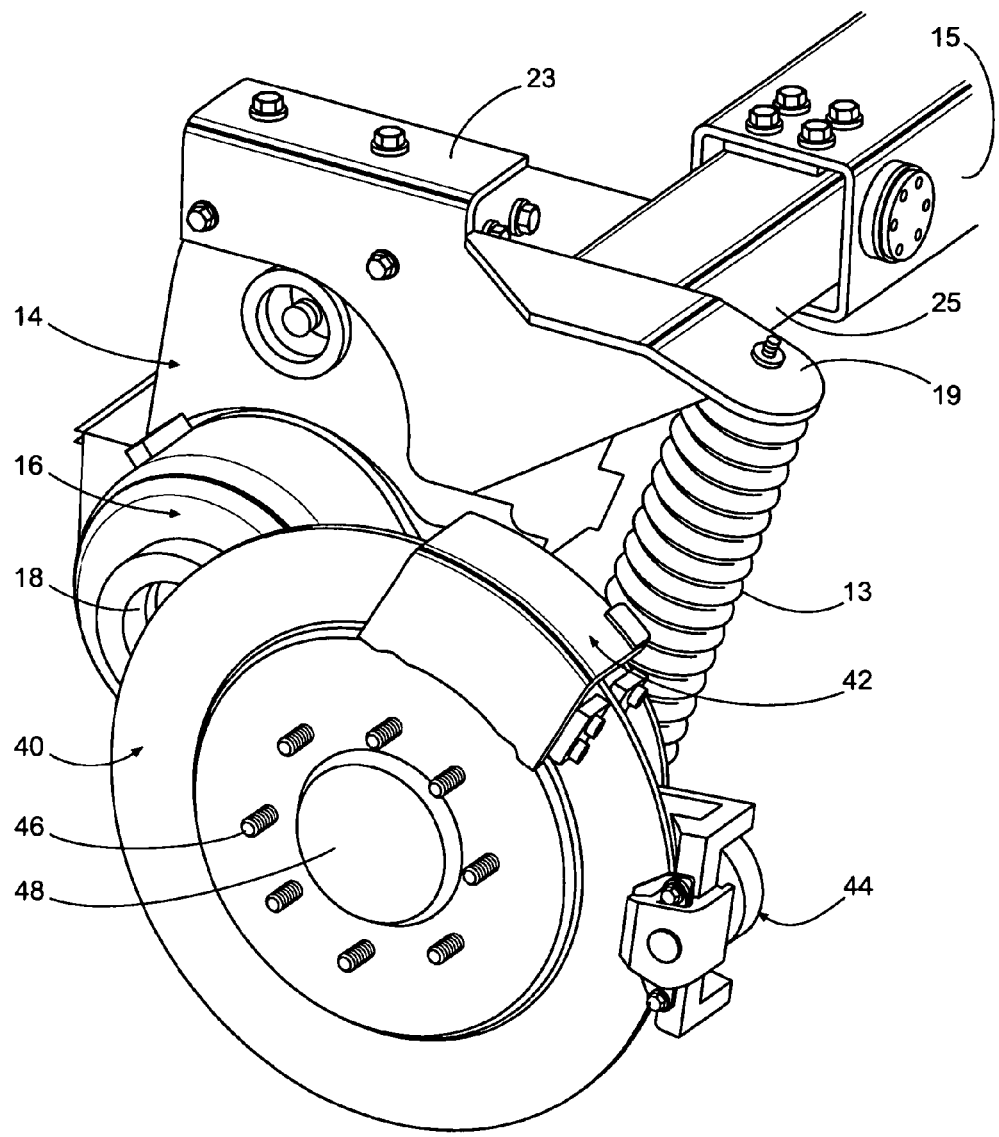

Superior ground clearance is also effected by designing at least part of the combination and drive system 10, specifically the lower drive assembly 16, brakes 40, 42, 44, and hub 48 (see FIG. 5) to fit within the backspacing of the wheel 20. In a preferred embodiment, the rim is at least forty-two inches in circumference which provides a sufficient area for enclosing the drive equipment.

In contrast, conventional drive systems utilize a differential and an axle in direct communication with the hub. In this manner, the ground clearance of the farm vehicle is limited by the wheel diameter.

The utilization of the drive and suspension system of the instant invention with a suitable farm vehicle chassis may provide a crop clearance of 48 inches as measured to the bottom of the inner support member 25 (see FIG. 7). The combination drive and suspension system is further applicable to all wheels on a farm vehicle should all wheel drive be needed. Various lower drive assembly 16 locations for different machine heights and different suspension methods (e.g., air or hydraulic) are also within the scope of the invention. In addition; one embodiment of the present invention incorporates a hydraulically-powered telescoping driveline to allow "on-the-fly" wheel track adjustment from the cab of the farm vehicle.

In operation, the field application vehicle may have a capacity of up to about 800 gallons of application substance (e.g., liquid fertilizer, insecticide, or pesticide). Furthermore, the invention enables suspension travel to occur below the chassis. Such a design provides additional structural and operational stability during field applications.

In the specification and the drawings, typical embodiments of the invention have been disclosed. Specific terms have been used only in a generic and descriptive sense, and not for purposes of limitation. The scope of the invention is set forth in the following claims.

What is claimed is:

1. A drive system for use with a farm vehicle, said system comprising:
    a first drive assembly;
    a second drive assembly,
    said first drive assembly extending in a substantially upright direction, with the first drive assembly being more upright than the second drive assembly; and
    a pivoting joint operably connecting said drive assemblies.

2. The drive system as claimed in claim 1,
    said drive assemblies each including a plurality of respective drive elements being drivingly connected with one another.

3. The drive system as claimed in claim 2,
    at least one of the drive elements of each of the drive assemblies being rotatable about a common axis of rotation.

4. The drive system as claimed in claim 3,
    said drive elements rotatable about the common axis of rotation being carried on a common stub shaft.

5. The drive system as claimed in claim 4,
    said common axis of rotation being coaxial with the pivoting joint.

6. A drive system for use with a farm vehicle, said system comprising:
    a first drive assembly;
    a second drive assembly,
    at least one of said drive assemblies extending in a substantially upright direction; and
    a pivoting joint operably connecting said drive assemblies,
    said drive assemblies each including a plurality of respective drive elements being drivingly connected with one another,
    at least one of the drive elements of each of the drive assemblies being rotatable about a common axis of rotation,
    said drive elements rotatable about the common axis of rotation being carried on a common stub shaft,
    said common axis of rotation being coaxial with the pivoting joint,
    said pivoting joint including a bushing pivot for enabling the drive assemblies to be pivotally mounted to one another.

7. The drive system as claimed in claim 2,
    one of said drive elements of the first drive assembly being configured to be driven via a differential,
    one of said drive elements of the second drive assembly being driven via the first drive assembly.

8. A drive system for use with a farm vehicle, said system comprising:
    a first drive assembly;
    a second drive assembly,
    at least one of said drive assemblies extending in a substantially upright direction;
    a pivoting joint operably connecting said drive assemblies,
    said drive assemblies each including a plurality of respective drive elements being drivingly connected with one another,
    one of said drive elements of the first drive assembly being configured to be driven via a differential,
    one of said drive elements of the second drive assembly being driven via the first drive assembly;
    a first frame member on which the differential is mounted; and
    a second frame member on which the first drive assembly is mounted, said frame members being laterally adjustable relative to one another.

9. The drive system as claimed in claim 8, said frame members being telescopically intercoupled with one another.

10. The drive system as claimed in claim 9; and a wheel configured to be driven by the second drive assembly.

11. A drive system for use with a farm vehicle, said system comprising:
   a first drive assembly;
   a second drive assembly,
   at least one of said drive assemblies extending in a substantially upright direction; and
   a pivoting joint operably connecting said drive assemblies,
   said first drive assembly extending in the substantially upright direction,
   said second drive assembly extending in a substantially level direction.

12. A drive system for use with a farm vehicle, said system comprising:
   a first drive assembly;
   a second drive assembly,
   at least one of said drive assemblies extending in a substantially upright direction;
   a pivoting joint operably connecting said drive assemblies;
   at least one frame member; and
   a suspension device operably extending between the at least one frame member and the second drive assembly to bias the system away from a fully compressed condition.

13. A farm vehicle configured to provide increased ground clearance as the vehicle moves over terrain, said vehicle comprising:
   a main frame including a first frame member and a second frame member;
   a power source mounted on the first frame member;
   a wheel supporting said main frame; and
   a first drive and suspension system mounted on the second frame member including:
      a first drive assembly,
      said first drive assembly being in driving communication with the power source;
      a second drive assembly,
      said second drive assembly being in driving communication with the first drive assembly,
      at least one of said drive assemblies extending in a substantially upright direction;
      a pivoting joint operably connecting said drive assemblies; and
      a suspension device operably extending between the second frame member and the second drive assembly to bias the first drive and suspension system away from a fully compressed condition,
   said wheel being in driving communication with the second drive assembly.

14. The farm vehicle as claimed in claim 13, said frame members being telescopically intercoupled so as to be laterally adjustable relative to one another.

15. The farm vehicle as claimed in claim 14; and a second drive and suspension system, said first and second drive and suspension systems being laterally adjustably positionable relative to the first frame member and to one another such that the farm vehicle includes adjustable track width.

16. The farm vehicle as claimed in claim 15, said drive assemblies cooperatively forming an obtuse angle relative to one another when the suspension device is disposed in other than the fully compressed condition, said drive assemblies being substantially orthogonal to one another when the suspension device is disposed in the fully compressed condition.

17. A method of shifting an output drive relative to an input power source in a farm vehicle, such that an effective driven axle height is axially spaced from than the drive line height, said shifting method comprising the steps of:
   (a) driving a first drive assembly with the power source;
   (b) driving a second drive assembly with an output of the first drive assembly,
   said drive assemblies being pivotally coupled to one another; and
   (c) powering a drive wheel with an output of the second drive assembly, said outputs of the drive assemblies being at least substantially vertically spaced from one another.

18. The shifting method as claimed in claim 17;
   (d) fixing the power source to a first frame member of the farm vehicle; and
   (e) fixing a portion of the first drive assembly to a second frame member of the farm vehicle,
   said frame members being laterally adjustably positionable relative to one another such that the farm vehicle includes adjustable wheel spacing.

19. The shifting method as claimed in claim 18; and
   (f) biasing a portion of the second drive assembly away from the second frame member with a suspension device.

\* \* \* \* \*